Dec. 12, 1933.  H. ERNST ET AL  1,938,773
ROTARY CUTTER
Filed March 27, 1930
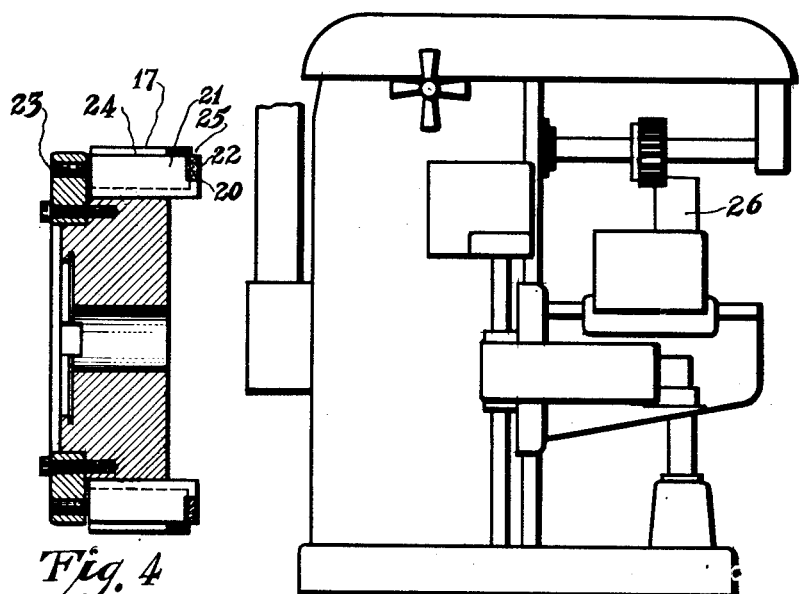
Fig. 4
Fig. 1
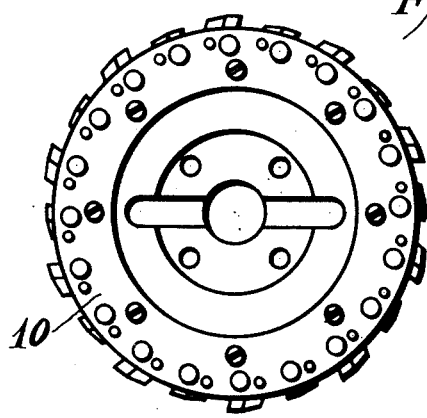
Fig. 2
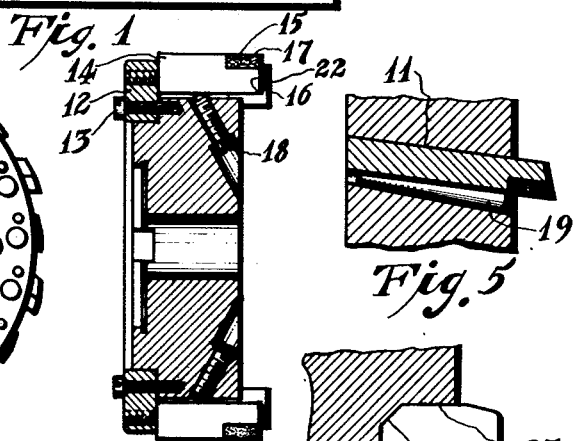
Fig. 3
Fig. 5
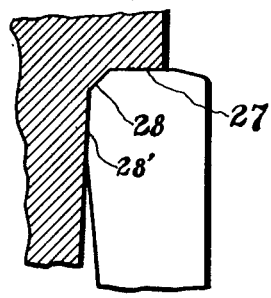
Fig. 6
Fig. 8
Fig. 7
Inventor
HANS ERNST
LESTER F. NENNINGER
By AHK Parsons
Attorney Patented Dec. 12, 1933

1,938,773

UNITED STATES PATENT OFFICE 1,938,773

ROTARY CUTTER

Hans Ernst and Lester F. Nenninger, Cincinnati, Ohio, assignors to The Cincinnati Milling Machine Company, Cincinnati, Ohio, a corporation of Ohio Application March 27, 1930. Serial No. 439,449

6 Claims. (Cl. 29—105)

This invention relates to rotary cutting tools having inserted blades and more particularly to those which have the blades tipped with an extremely hard cutting substance such as cemented tungsten carbide.

Experience in the use of extremely hard cutting materials indicates that such materials develop considerable heat, due to the high cutting speed to which they are subjected. It has also been found that these materials cannot be ground or sharpened quickly but, on the other hand, it is a long tedious operation, requiring a considerable amount of care on the part of the operator for the reason that in the grinding operation too much pressure cannot be applied without causing heating of the material to such an extent as to actually damage the cutting material such as cemented tungsten carbide. It is the usual practice in grinding multiple blade rotary cutters, to index the cutter head on a spindle mounted in fixed relation to a grinding wheel, thereby effecting a peripheral cutting edge on each blade which is a fixed radial distance from the center of the cutter and a cutting edge on the face of each blade that is at right angles to the axis of the cutter. In following this procedure with blades having cuttings tips of extremely hard substance, practice has shown that these substances have a tendency to chip at the cutting edge during the sharpening operation, thus forming a slight cavity therein. If this happens, it follows that all the blades must be ground down until the cavity in one blade has disappeared, in order to produce a tool with blades that will cut evenly and equally. This results in a considerable loss of time both as to the grinding operation and to the shut-down time of the machine.

It is therefore one of the objects of this invention to provide a new and improved cutter which will overcome the above difficulties.

It is a further object of this invention to provide an improved arrangement of blades in a cutter head, that will prevent excessive heating of the blades when subjected to high cutting speeds.

Other objects and advantages of this invention will be apparent by reference to the following specification, considered in conjunction with the accompanying drawing illustrative of one embodiment thereof, but it will be understood that any modifications may be made in the specific structural details hereinafter disclosed, within the scope of the appended claims, without departing from or exceeding the spirit of the invention.

Referring to the drawing, in which like reference numerals indicate like parts.

Figure 1 is an elevation of a machine tool showing one use of the cutter of this invention;

Figure 2 is an end view of a cutter head embodying the principles of this invention;

Figure 3 is a section through the cutter head, showing the adjustment of the peripheral cutting blades;

Figure 4 is a section similar to Figure 3, showing the adjustment of the end cutting blades;

Figure 5 is a detail of the blade clamping means;

Figure 6 is a detail showing a conventional cutting blade;

Figure 7 is a detail of the chip formed by the blade shown in Figure 6; and

Figure 8 is a detail of the chip formed by the peripheral cutter of this invention.

Referring to Figures 3 and 4, the reference numeral 10 indicates the cutter head having a plurality of slots 11 for receiving the cutter blades. The head 10 is provided with a backing ring 12 attached to the head 10 by means of the screws 13.

The cutter of this invention is provided with two forms of cutting blades, alternately spaced with respect to each other around the periphery of the cutter. One form of these blades, such as 14 in Figure 3 and which will be referred to as peripheral cutting blades, have welded or brazed therein a piece of cemented tungsten carbide or the like 15 forming a cutting edge which extends longitudinally of the blades. It will be noted that this cutting material also extends for a small distance along the radial edge of the blade 14. The latter is only intended to cut along the edge 17 and therefore adjustment is only provided in one direction. The blades 14 are placed in the cutter head so as to abut the backing ring 12 and are adjusted radially by the set screw 18 to the proper diameter and then clamped in place by the tapered pin 19.

The other form of blades, to be known herein as end or face cutting blades, have a piece of cemented tungsten carbide or the like 20 welded or brazed to the end of the blade 21 extending along the radial edge of the blade. Since these blades are intended to cut only upon their end, adjustment is only provided in a longitudinal direction. In this case the blades are inserted in the cutter head so as to rest on the bottom of the slot 11. The set screw 23, mounted in the backing ring 12, is provided, for effecting the longitudinal adjustment, and a tapered pin, such as 19, is used to clamp them into place after they are properly adjusted.

It should be noted that the cutting edge 17 of the blade 14 is at greater radial distance from the center of the cutter head than the edge 24 of the blade 21. This difference in distance is not great, amounting to only a few thousandths of an inch, but large enough so that the cutting edge 17 does all the peripheral cutting and the edge 24 no peripheral cutting except at its very end, which will be described later. It should also be noted that the cutting edge 22 projects further from the cutter head than the edge 16 of the blade 14. The difference however, is not great, being again only a few thousandths of an inch. From this, it will be seen that there is a small corner 25 which is a few thousandths of an inch in length on each side. This means that the blade 21 has an end cutting edge 22 and a slight longitudinal cutting edge of a few thousandths of an inch in length and that the blade 14 has a peripheral cutting edge 17 and a slight end cutting edge. By arranging the blades in this alternating sequence, the cutter may form a corner on a piece of work, such as 26 in Figure 1 very efficiently due to the fact that a single blade cuts on only one surface. In the ordinary type of cutter, as shown in Figure 6, which has the cutting edges 27, 28 and 28', the whole cut is made by each blade or tooth forming a chip such as shown in Figure 7, while in the cutter of this invention, part of the cut is made by one blade and part of the cut is made by the other blade, forming principal chips such as shown in Figure 8. From a comparison of the chips, it will be seen that more work was required and more heat was generated in removing the chip such as shown in Figure 7, than was required to remove the chip such as shown in Figure 8. It follows that if more heat was generated in removing the former chip than was generated in removing the latter, the cutting blade which removed the chip shown in Figure 7 must have absorbed more heat than the cutter blade which removed the chip shown in Figure 8.

In sharpening the cutter of this invention, all of the blades are individually ground until each has a perfect cutting edge. This is necessary because the material used to tip the blades is somewhat brittle and has a tendency to chip at the edge. The sharpening may be done by removing the blades from the cutter, grinding an edge on each blade and then replacing them in the cutter and adjusting them or they may be sharpened without removing them from the cutter head in which case each blade is individually sharpened after which all the blades are adjusted to cutting position. It is thus seen that due to the nature of the cutting material, it is first necessary to produce a perfect cutting edge on each blade and then to adjust all the blades in the head so that the peripheral cutting edges lie in a cylinder of revolution and the end or face cutting edges lie in a plane at right angles to the axis of the cylinder of revolution.

What is claimed is:

1. A rotary cutter having a body with a plurality of longitudinal slots, a plurality of blades mounted in said slots, the alternate blades having longitudinal cutting edges and the remaining blades having radial cutting edges, means to adjust the alternate blades radially of the body, and means to adjust the remaining blades longitudinally of the body.

2. In a rotary cutter a body having a plurality of longitudinal slots therein, a backing ring attached to said body and closing one end of said slots, a cutting blade mounted in each slot, the alternate blades resting on the bottom of the slots and having means to longitudinally adjust them, the remaining blades abutting said backing ring and having means to adjust them radially of the body.

3. A rotary cutter comprising a cylindrical body, a plurality of insertable cutter teeth mounted in the body parallel to the axis thereof, a cemented tungsten carbide cutting edge formed on the longitudinal side of each alternate tooth, a cemented tungsten carbide cutting edge formed on the end face of the intervening teeth, means to adjust the alternate teeth to a cutting position beyond the periphery of the intervening teeth, and means to adjust the intervening teeth longitudinally to a cutting position beyond the end of the alternate teeth, whereby peripheral cutting will be performed by the alternate teeth and end cutting will be performed by the intervening teeth.

4. A rotary cutter comprising a cylindrical body having a plurality of longitudinal slots formed therein and equally spaced thereabout, an insertable cutter tooth mounted in each slot, alternate teeth having a cutting edge of cemented tungsten carbide formed on the respective face lying in the periphery of the cutter, the remaining intervening teeth having a cutting edge of cemented tungsten carbide formed on the respective face thereof lying in the end of the cutter, means to adjust the alternate teeth radially to align their cutting edges in a surface of revolution concentric to the axis of the body, means to adjust the remaining blades to align their cutting edges in the plane perpendicular to the axis of the cutter, and means to clamp all of the blades in position after adjustment, whereby the heat generated by the peripheral cutting edges will be absorbed by said alternate teeth and the heat generated by the end cutting edges will be absorbed by the remaining intervening teeth.

5. A rotary cutter comprising a cylindrical body, a plurality of slots equally spaced about the periphery of said body, individual blades having a longitudinal cutting edge mounted in alternate slots with their cutting edges extending parallel to the axis of the body, additional cutting blades having an end cutting edge mounted in the remaining slots and projecting from the end thereof, said end cutting edges extending radially from the axis of the body, a backing ring closing the other end of said slots, means in the body of the cutter for adjusting the longitudinal blades radially relative to a preedtermined surface of revolution concentric to the axis of the body, and means in the backing ring to adjust the additional blades axially to align their cutting edges in a common plane at right angles to the axis of the cutter and closely adjacent the base of the surface of revolution, whereby the heat generated by the peripheral cutting edges will be absorbed by one set of blades and the heat generated by the radial cutting edges will be absorbed by the other set of blades.

6. A rotary cutter comprising a body having a plurality of radially extending cutting edges lying in one plane, a plurality of longitudinal cutting edges lying in a cylinder of revolution, the radial planes containing the longitudinal cutting edges being angularly displaced with respect to the radial planes containing the radial cutting edges and non-coincident therewith, said longitudinal cutting edges terminating in the circumference of the base of said cylinder of revolution, said base being parallel to but spaced from the common plane containing all of the radial cutting edges whereby successive pairs of edges will cooperate to remove a single chip section.

HANS ERNST.
LESTER F. NENNINGER.